(12) United States Patent
Villar Duran et al.

(10) Patent No.: US 12,472,046 B2
(45) Date of Patent: Nov. 18, 2025

(54) POWER TOOTHBRUSH CONTROL

(71) Applicant: KONINKLIJKE PHILIPS N.V., Eindhoven (NL)

(72) Inventors: Jose Martin Villar Duran, Lake Forest Park, WA (US); Chelsea Pereira, Bothell, WA (US); Gul Dikmen, Bothell, WA (US); Ivonne Labadie Lezama, Bothell, WA (US); Elizabeth Michelle Starke, Seattle, WA (US); Robert Joseph Leigh Phibbs, Seattle, WA (US); Brian Esley Tidball, Bothell, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 344 days.

(21) Appl. No.: 18/266,234

(22) PCT Filed: Dec. 6, 2021

(86) PCT No.: PCT/EP2021/084343
§ 371 (c)(1),
(2) Date: Jun. 8, 2023

(87) PCT Pub. No.: WO2022/128560
PCT Pub. Date: Jun. 23, 2022

(65) Prior Publication Data
US 2024/0050211 A1  Feb. 15, 2024

Related U.S. Application Data

(60) Provisional application No. 63/125,910, filed on Dec. 15, 2020.

(30) Foreign Application Priority Data

Mar. 18, 2021  (EP) ..................................... 21163344

(51) Int. Cl.
*A61C 17/22* (2006.01)
*A61C 17/26* (2006.01)

(52) U.S. Cl.
CPC ............ *A61C 17/221* (2013.01); *A61C 17/26* (2013.01)

(58) Field of Classification Search
CPC .................. A61C 17/221; A61C 17/26; A46B 2200/1066; A46B 15/0008; A46B 13/02
See application file for complete search history.

(56) References Cited

U.S. PATENT DOCUMENTS 10,242,566 B2  3/2019  Schiebahn et al.
10,543,069 B2  1/2020  Tamminga et al.
(Continued)

FOREIGN PATENT DOCUMENTS

CN  110934655 A  *  3/2020  ........... A61C 17/221

OTHER PUBLICATIONS

International Search Report and Written Opinion Dated Feb. 28, 2022 For International Application No. PCT/EP2021/084343 Filed Dec. 6, 2021.

*Primary Examiner* — C. A. Rivera

(57) ABSTRACT

A power toothbrush (10) is disclosed comprising a motor (12) for driving a brush head (15) of the power toothbrush and a controller (20) responsive to an operating mode selection signal and arranged to control said motor. The controller comprises a timer (22) for timing a total duration of a tooth brushing session with said power toothbrush and is adapted to, in a feedback mode of operation, calculate an average total duration of a tooth brushing session based on stored prior tooth brushing session times; define a target value based on the calculated average total duration and cause the generation of a sensory output during a tooth brushing session upon its duration reaching the target value to encourage the user to carry on brushing. Also disclosed is (Continued)

a method of evaluating tooth brushing session data generated by such a power toothbrush, a computer program product for implementing such a method, an electronic device adapted to implement such a method and an oral hygiene kit.

16 Claims, 5 Drawing Sheets

(56) References Cited

U.S. PATENT DOCUMENTS

| | | |
|---|---|---|
| 2010/0175208 A1* | 7/2010 | Hilfinger ............ G09B 19/0084 15/22.1 |
| 2012/0171657 A1 | 7/2012 | Ortins et al. |
| 2017/0004703 A1 | 1/2017 | Schiebahn et al. |
| 2018/0020819 A1 | 1/2018 | Steckling |

* cited by examiner

POWER TOOTHBRUSH CONTROL

This application is the U.S. National Phase application under 35 U.S.C. § 371 of International Application No. PCT/EP2021/084343, filed on Dec. 6, 2021, which claims the benefit of U.S. Application Ser. No. 63/125,910, filed Dec. 15, 2020 and EP Application Serial No. 21163344.1, filed Mar. 18, 2021. These applications are hereby incorporated by reference herein.

FIELD OF THE INVENTION

The present invention relates to a power toothbrush comprising a motor for driving a brush head of the power toothbrush and a controller arranged to control said motor, said controller comprising a timer for timing a total duration of a tooth brushing session with said power toothbrush.

The present invention further relates to a computer-implemented method of evaluating tooth brushing session data by receiving tooth brushing session data from a controller of a power toothbrush.

The present invention yet further relates to a computer program product for implementing such a method.

The present invention yet further relates to an electronic device comprising a processor arrangement and such a computer program product.

The present invention still further relates to an oral hygiene kit comprising such a power toothbrush and computer program product.

BACKGROUND OF THE INVENTION

Power toothbrushes have transformed oral hygiene maintenance by offering superior cleaning capabilities compared to manual brushing. However, in order to ensure that optimal cleaning results are achieved, the user of such a power toothbrush has to use the power toothbrush correctly. To this end, the power toothbrush may contain one or more sensors that detect pressure applied with the power toothbrush, power toothbrush orientation and so on. The power toothbrush may generate a warning if the user is not using the power toothbrush correctly to allow the user to correct his or her brushing technique, or may send such sensor data to an associated app running on an electronic device such as a smart phone, tablet computer or the like to offer an evaluation of the characteristics of such a brushing session to the user.

Another important parameter associated with the quality of a tooth brushing session with the power toothbrush is the total duration of the tooth brushing session. To this end, the controller of the power toothbrush may include a timer that times the duration of the tooth brushing session and cause the generation of an alert once this duration has reached a recommended value, e.g. 2 minutes to inform the user that the recommended duration of the tooth brushing session has been reached. In a further refinement, the controller may cause the generation a plurality of temporally equidistant alerts, e.g. every or 30 seconds, to assist the user in dedicating equal amounts of time to the brushing of different regions of the user's teeth, e.g. the biting surfaces and/or the front and back of the upper and lower teeth respectively.

Notwithstanding the generation of such an alert to signal the end of a brushing session (or part thereof), many users are known to prematurely terminate a tooth brushing session with such a power toothbrush, i.e. before the generation of the alert. Consequently, the efficiency of the tooth brushing session is compromised, significantly increasing the likelihood of incomplete removal of contaminants such as dental plaque and food residues.

US 2010/0175208 discloses a toothbrush in which an actual cleaning time is compared with a target cleaning time. There is a standard cleaning time, but additional time may be added to this standard cleaning time to derive the target cleaning time, in particular when the user has previously had a cleaning time shorter than the standard cleaning time.

SUMMARY OF THE INVENTION

The present invention seeks to provide a power toothbrush that is arranged to encourage a user to continue a tooth brushing session if the user is prone to prematurely terminate such a session.

The present invention further seeks to provide a computer-implemented method arranged to evaluate if the user is prone to prematurely terminate a tooth brushing session on a regular basis.

The present invention yet further seeks to provide a computer program product for implementing such a method.

The present invention yet further seeks to provide an electronic device arranged to implement such a method.

The present invention still further seeks to provide an oral hygiene kit comprising such a power toothbrush and computer program product.

According to an aspect, there is provided a power toothbrush comprising a motor for driving a brush head of the power toothbrush and a controller responsive to an operating mode selection signal and arranged to control said motor, said controller comprising a timer for timing a total duration of a tooth brushing session with said power toothbrush and being adapted to store the timed total duration of said tooth brushing session; in a first mode of operation, cause the generation of a first sensory output during a tooth brushing session upon its duration reaching a default target value corresponding to a recommended duration of the tooth brushing session; switch between the first mode of operation and a further mode of operation in response to said operating mode selection signal, and in said further mode of operation, calculate an average total duration of a tooth brushing session based on at least some of the stored tooth brushing session times;

define a further target value based on the calculated average total duration of the stored tooth brushing total durations; and cause the generation of a further sensory output during a tooth brushing session upon said duration reaching the further target value.

The present invention provides a power toothbrush that has a mode of operation in which it encourages users to continue brushing if such users have a tendency of prematurely terminating a tooth brushing session, e.g. before the recommended minimum 2 minutes, by the generation of a further sensory output at a point in time derived from the brushing history of such a user, i.e. the average tooth brushing session time achieved by this user, such that the user can be encouraged by the generated further sensory output to continue brushing.

To this end, the controller preferably is adapted to define the further target value as said calculated average total duration minus a defined amount of time to increase the likelihood that the further sensory output is generated prior to the user terminating his or her tooth brushing session. The defined amount of time may be chosen in a range of 2-30 seconds and preferably 2-10 seconds such that the further sensory output is generated shortly before the typical point in time at which the user terminates his or her tooth brushing session, thereby providing a clear correlation between this point in time and the encouragement to the user to continue the tooth brushing session.

In a preferred embodiment, the controller is further adapted to, in said second mode of operation, calculate an updated average total duration of a tooth brushing session based on at least some of the stored tooth brushing session times including at least one tooth brushing session time stored after initiating said second mode of operation; update the further target value based on the calculated updated average total duration of the stored tooth brushing total durations; and cause the generation of a further sensory output during a tooth brushing session upon said duration reaching the updated further target value. By generating the further sensory output at a point in time that is a function of the moving average of the duration of the user's tooth brushing sessions, the correlation between the point in time at which the further sensory output is generated and the point in time at which the user terminates the tooth brushing session is maintained, which therefore optimizes the likelihood that the user will remain encouraged to extend the tooth brushing session.

The controller may be further adapted to, in said second mode of operation, compare the updated further target value with the default target value; and switch from the second mode of operation to the first mode of operation upon a difference between said updated further target value and the default value falling below a defined threshold. Once the controller establishes that the total duration of the user's tooth brushing sessions approximates or exceeds the recommended total duration of the tooth brushing session, the controller may cause the power toothbrush to revert back to its first mode of operation in which the controller causes the generation of the default or first sensory output at the recommended duration of the tooth brushing session as the need to encourage the user to extend the tooth brushing session no longer exists.

The first and further sensory outputs may be generated in any suitable form, e.g. as a haptic, visual or audible output, or any suitable combination of such outputs. For example, the controller may be adapted to cause the generation of at least one of the first sensory output and the further sensory output with the motor in the form of haptic feedback, e.g. a vibration pattern or the like, which has the advantage that no additional sensory output generator is required. In a particular embodiment, the controller is adapted to switch off said motor at the further target value or the updated further target value such that the user has to manually switch the power toothbrush back on, which encourages the user to carry on brushing for more than a few seconds.

Alternatively or additionally, the power toothbrush further comprises a sensory output device, wherein the controller is adapted to cause the generation of at least one of the first sensory output and the further sensory output with the sensory output device. Such a sensory output device may take any suitable shape or form, e.g. one or more light sources, e.g. LEDs, a speaker and so on.

Preferably, the first sensory output and the further sensory output are different sensory outputs such that the user can clearly distinguish between a sensory output signalling the tooth brushing session reaching a recommended duration and a sensory output encouraging the user to continue the tooth brushing session. The first sensory output and further sensory outputs may be different types of outputs, e.g. a haptic output and a visual output, or may be different outputs of the same type, e.g. different haptic outputs, visual outputs or audible outputs.

In an embodiment, the controller is adapted to cause transmission of tooth brushing session data including an indication of the total duration of a tooth brushing session to an evaluation module; and receive the operation mode selection signal from the evaluation module. This for instance may be the case where the power toothbrush is supported by an app implementing such an evaluation module, which app may run on a portable electronic device such as a smart phone or a tablet computer and may evaluate such tooth brushing data to determine whether the user regularly terminates a tooth brushing session prematurely, in which case the app can cause the generation of the operation mode selection signal and its transmission to the controller of the power toothbrush, such that the controller switches the power toothbrush from the first mode of operation to the second mode of operation as a result. Alternatively, the power toothbrush may further comprise the evaluation module to provide a power toothbrush including such evaluation capabilities.

According to another aspect, there is provided a computer-implemented method of evaluating tooth brushing session data including an indication of the total duration of a tooth brushing session, the method comprising receiving tooth brushing session data from a controller of a power toothbrush; evaluating, after receiving tooth brushing session data from the power toothbrush for a plurality of tooth brushing sessions, compliance of the total duration of each tooth brushing session with a recommended target value for said total duration; and transmitting an operation mode selection signal to said controller if said evaluation shows that for at least some of the tooth brushing sessions in said plurality of tooth brushing sessions the total duration of said tooth brushing sessions is shorter than the recommended target value for said total duration. With such a method, the typical total duration of the tooth brushing sessions of a particular user may be evaluated and if this evaluation indicates that the user regularly fails to reach the recommended total duration of a tooth brushing session, an operation mode selection signal may be generated and provided to the power toothbrush forcing the power toothbrush into user training mode to encourage the user to extend the duration of the tooth brushing sessions as previously explained.

This method may be part of a computer-implemented method of controlling an operating mode of the power toothbrush.

According to yet another aspect, there is provided a computer program product comprising a computer readable storage medium having computer readable program instructions embodied therewith for, when executed on a processor arrangement of an evaluation module, cause the processor arrangement to implement the method of any of the herein described embodiments. Such a computer program product may be installed on an electronic device, e.g. a portable electronic device such as a smart phone, tablet computer or the like, in order to enable such an electronic device to perform the tooth brushing session data provided by the power toothbrush and, if necessary, generate the operating mode selection signal that causes the power toothbrush to switch to the user training mode in which the user is encouraged to extend the duration of the tooth brushing sessions as previously explained.

According to still another aspect, there is provided an electronic device comprising a processor arrangement and the computer program product of any of the herein described embodiments, wherein the processor arrangement is arranged to execute said computer readable program instructions. The installation of this computer program product enables the electronic device to perform the tooth brushing session data provided by the power toothbrush and, if necessary, generate the operating mode selection signal that causes the power toothbrush to switch to the user training mode in which the user is encouraged to extend the duration of the tooth brushing sessions as previously explained.

According to still another aspect, there is provided an oral hygiene kit comprising the power toothbrush and the computer program product of any of the herein described embodiments, which oral hygiene kit facilitates the evaluation of tooth brushing session data and the control of the operating modes of the power toothbrush as previously explained.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
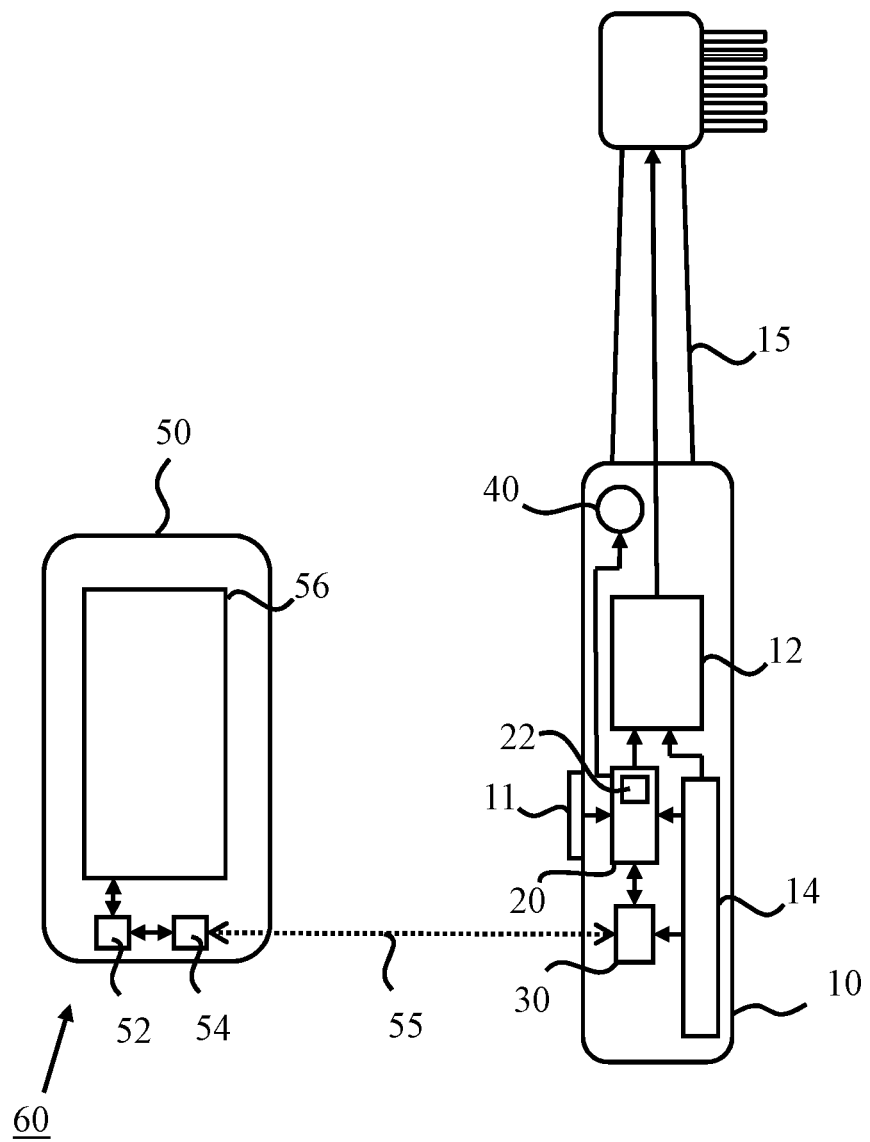
FIG. 1 schematically depicts a power toothbrush according to an embodiment.

It should be understood that the Figures are merely schematic and are not drawn to scale. It should also be understood that the same reference numerals are used throughout the Figures to indicate the same or similar parts.

FIG. 1 schematically depicts a power toothbrush 10 according to an embodiment of the present invention. The power toothbrush 10 comprises a handle onto which a brush head 15 may be mounted such that the brush head 15 is driven by a motor 12 in the handle. The handle further contains a rechargeable power source 14, e.g. one or more rechargeable batteries, which is arranged to power the motor 12. A controller 20 is also present in the handle, which controller 20 is arranged to activate the motor 12, e.g. by enabling a switch (not shown) in the electrically conductive path between the rechargeable power source 14 and the motor 12 in response to a user activating the power toothbrush 10 through a button 11 or any other suitable user interface.

The controller 20 further comprises a timer 22 arranged to time a total duration of a tooth brushing session performed with the power toothbrush 10 and to trigger the generation of a sensory output at particular points in time during the tooth brushing session in a first mode of operation of the power toothbrush 10, e.g. a default mode of operation. For example, the timer 22 may trigger the generation of intermediate sensory outputs at set points in time, e.g. every 20 or 30 seconds, to assist a user in dedicating the correct amount of time in cleaning a particular section, e.g. quadrant, of the user's teeth. Additionally or alternatively, the timer may trigger a sensory output once the duration of the tooth brushing session has reached a recommended amount of time, e.g. 2 minutes, to inform the user that sufficient time has been dedicated to the brushing of the user's teeth. The intermediate sensory outputs typically differ from the sensory output generated once the tooth brushing session has reached the recommended amount of time such that the user can correctly interpret the meaning of the generated sensory outputs.

In the context of the present application, a sensory output is an output that can be detected by one or more of the user's senses, particularly touch, sight or hearing. The sensory outputs may take any suitable shape or form. For instance, the sensory outputs may be visual, audible or haptic. Such sensory outputs may be generated by targeted control of the motor 12 with the controller 20 or with dedicated sensory output device 40 under control of the controller 20. As the generation of such sensory outputs is well known per se, this is not explained in further detail for the sake of brevity only.

The power toothbrush 10 further comprises a communication interface 30 communicatively coupled to the controller 20, which communication interface may establish a communication link 55 with a communication interface 54 of an electric device 50 further comprising a processor arrangement 52 communicatively coupled to the communication interface 54. Any suitable communication protocol, e.g. Bluetooth or another P2P communication protocol, may be used for this purpose. The electronic device 50, e.g. a smart phone, tablet computer or the like, is adapted to operate as an evaluation module 60 of tooth brushing session data provided to the evaluation module 60 by the controller 20 over the communication link 55 for processing by the processor arrangement 52. Such tooth brushing session data typically comprises an indication of the total duration of the tooth brushing session, and may further include sensor data from one or more sensors (not shown) integrated in the power toothbrush 10, e.g. a proximity sensor, force gauge, orientation sensor such as a gyroscope or the like, and so on, to allow the evaluation module to evaluate the tooth brushing session and provide feedback derived from this evaluation to the user, e.g. by displaying such feedback on the display 56 of the electronic device 50.

Figure 2:
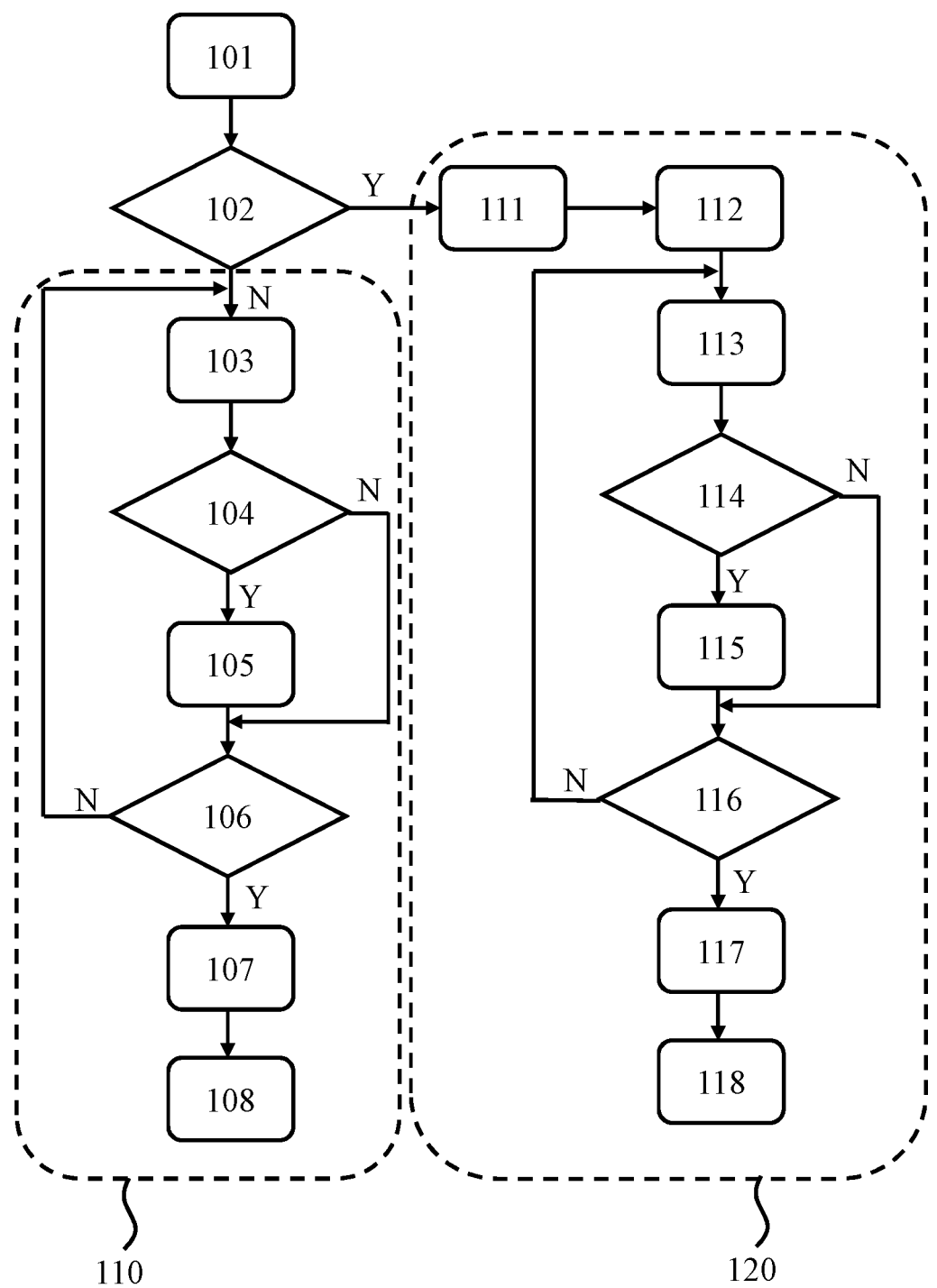
FIG. 2 schematically depicts a flowchart of a method of operating such a power toothbrush according to an embodiment.

In accordance with embodiments of the present invention, the power toothbrush 10 may be switched between a first mode of operation, which may be its default mode of operation, and a second mode of operation in which its user is encouraged to extend a tooth brushing session, e.g. when the user has a tendency to prematurely terminate a tooth brushing session, that is, before the total duration of the tooth brushing session reaches 2 minutes. This is explained in more detail in FIG. 2, which depicts a flowchart of a method 100 of operating the power toothbrush 10, including the first mode of operation 110 and the second mode of operation 120. The method 100 starts in operation 101, with a user turning on the power toothbrush 10 with the button 11, or in any other suitable manner, after which the method 100 proceeds to operation 102 in which the controller 20 checks in which mode of operation the power toothbrush 10 should operation during the tooth brushing session.

For example, if the power toothbrush 10 is to operate in its first mode of operation 110, the controller 20 starts the timer 22 in operation 103, after which the controller 20 checks the timer 22 in operation 104 to determine if a defined point in time has been reached at which a sensory output has to be generated, such as an intermediate sensory output to indicate completion of a time interval corresponding to the cleaning time to be dedicated to a particular section, e.g. quadrant, of the user's teeth, or sensory output indicative of the user's tooth brushing session having reached a recommended duration as explained above. If the controller 20 determines in operation 104 that such a point in time has been reached, the controller 20 proceeds to operation 105 in which the controller 20 controls the motor 12 and/or the sensory output device 40 to generate the appropriate sensory output to signal to the user that this point in time has been reached, after which the controller 20 proceeds to operation 106. If the controller 20 determines in operation 104 that such a defined point in time for generating a sensory output has not yet been reached, the controller 20 skips operation 105 and proceeds directly to operation 106.

In operation 106, the controller 20 checks if the user has terminated the tooth brushing session or carries on brushing. If the user carries on brushing, the controller 20 returns back to operation 103 in which the controller 20 keeps timing the duration of the tooth brushing session with the timer 22. If on the other hand the controller 20 determines in operation 106 that the user has terminated the tooth brushing session, the controller 20 may proceed to operation 107 in which data of the tooth brushing session, e.g. sensor data if present and the total duration of the tooth brushing session, optionally augmented by further information such as the time or day or the like, is stored in a data storage device (not shown) such as a memory or the like incorporated in the handle of the power toothbrush 10. For example, such a data storage device may form part of the controller 20 or may be a separate entity within the power toothbrush 10. In addition, the controller 20 may send the collected data for evaluation to the evaluation module 60 in operation 107 over the data communication link 55 using the data communication interface 30, after which the first mode of operation terminates in operation 108.

Figure 3:
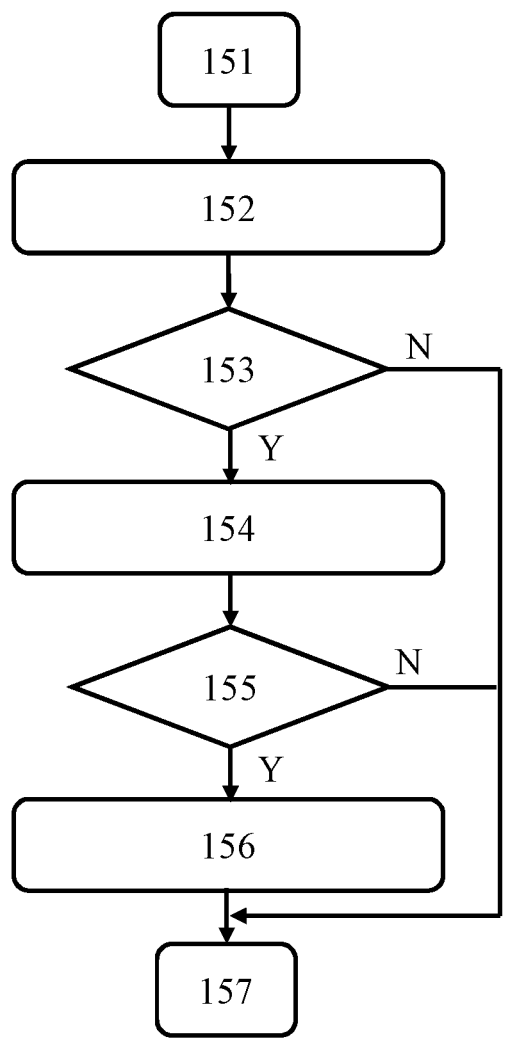
FIG. 3 schematically depicts a flowchart of a tooth brushing data evaluation method according to an embodiment.

The data evaluation method 150 implemented by the operation of the evaluation module 60 is schematically depicted in FIG. 3. The method 150 starts in operation 151, e.g. be establishing the communication link 55 between the evaluation module 60 and the power toothbrush 10, after which the method 150 proceeds to operation 152 in which the evaluation module 60, e.g. with its processor arrangement 52 comprising one or more processor elements, receives the tooth brushing session data from the controller 20 for evaluation, i.e. processing. To this end, the controller 20 may retrieve the tooth brushing session data from the data storage device, or alternatively the controller 20 may directly forward this data to the evaluation module 60. The data, when retrieved from the data storage device, may be data pertaining to multiple tooth brushing sessions, e.g. in case the power toothbrush 10 is not communicatively coupled to the evaluation module 60 during every tooth brushing session. The evaluation module 60 may evaluate the data from a single tooth brushing session and present the evaluation result to the user, e.g. on the display device 56 of the electronic device 50, as is well known per se.

However, in line with embodiments of the present invention, the evaluation module 60 is adapted to evaluate in operation 153 if data pertaining to a sufficient number of tooth brushing sessions has been forwarded to the evaluation module 60 by the controller 20. This may be based on a single data transfer in which the controller 20 transfers data pertaining to a number of tooth brushing sessions, or may be based on a number of such data transfers in which the evaluation module 60 has stored the previously received data and/or the data evaluation results. In particular, the evaluation module 60 checks in operation 153 if timing information indicative of the total duration of a tooth brushing session has been received for a sufficient number of tooth brushing sessions to allow a determination of how well the user is complying with the recommended minimum duration of a tooth brushing session, e.g. 2 minutes. This evaluation may be based on any suitable number of tooth brushing sessions, e.g. 5 sessions, 10 sessions and so on. If the evaluation module 60 determines in operation 153 that the sufficient number of tooth brushing sessions for which data has been received has not yet been reached, the method 150 proceeds to operation 157 in which the method 150 terminates.

On the other hand, if the evaluation module 60 determines in operation 153 that the sufficient number of tooth brushing sessions for which data has been received has been reached, the method 150 proceeds to operation 154 in which the evaluation module 60 determines for each tooth brushing session whether the user has complied with the recommended target value for the total duration of the tooth brushing session, and where this is not the case, if the number of non-compliant tooth brushing sessions indicates that the user is not complying with the recommended minimum duration of the tooth brushing session on a regular or consistent basis. The evaluation module 60 may base this determination on a fraction or percentage of the number of evaluated tooth brushing sessions having a total duration (well) below the recommended minimum duration of a tooth brushing session, e.g. at least 30 seconds below this recommended minimum duration.

The evaluation module 60 then checks in operation 155 if the evaluation result indicates that the user regularly or consistently fails to comply with the recommended minimum duration, e.g. if at least half (50%) or more of the evaluated tooth brushing sessions show such non-compliant behaviour. If this is not the case, the method 150 proceeds to operation 157 in which the method 150 terminates. Otherwise, the method 150 proceeds to operation 156 in which the evaluation module 60 transmits an operation mode selection signal to the controller 20 before terminating in operation 157. The evaluation module 60 may automatically generate the operation mode selection signal or may generate this signal in response to a user of the evaluation module 60 indicating that this signal should be generated, e.g. after presenting the user with the evaluation result of operation 155 on the display device 56 and giving the user the option to switch the power toothbrush 10 to its second mode of operation.

Now, upon returning to FIG. 2, the controller 20 determines in operation 102 if such an operation mode selection signal has been received, e.g. by setting a flag in memory or the like when this signal has been received and checking this flag every time the user activates the power toothbrush 10. If the controller 20 determines in operation 102 that such an operation mode selection signal indeed has been received, the controller 20 switches to the second mode of operation 120 of the power toothbrush 10, in which the controller 20 in operation 111 calculates an average total duration of a number of previous tooth brushing sessions from the data stored in the data storage device, e.g. based on a number of most recent tooth brushing sessions, e.g. the last 5, 10 or 20 tooth brushing sessions or any other suitable number of most recent tooth brushing sessions.

In operation 112, the controller 20 defines a further target value, i.e. a point in time, for the generation of a further sensory output during the tooth brushing session in progress. The further sensory output has the purpose of encouraging the user to continue the tooth brushing session. This further target value is based on the average total duration of the stored tooth brushing sessions as calculated in operation 111 and is preferably defined as this calculated average total duration minus a defined amount of time to increase the likelihood that the further sensory output will be generated before the user's likely point in time at which the user terminates the tooth brushing session. For example, this defined amount of time may be in a range of 2-30 seconds and preferably in a range of 2-10 seconds, i.e. shortly before the user intends to prematurely terminate the tooth brushing session, such that the user can clearly associate the further sensory output with an encouragement to continue brushing.

Once the further target value has been defined, the second mode of operation 120 proceeds analogously to the first mode of operation 110 in that during operation 113, the controller 20 starts the timer 22, after which the controller 20 checks the timer 22 in operation 114 to determine if a defined point in time has been reached at which the further sensory output has to be generated. If the controller 20 determines in operation 114 that such a point in time has been reached, the controller 20 proceeds to operation 115 in which the controller 20 controls the motor 12 and/or the sensory output device 40 to generate the further sensory output to encourage the user to continue brushing after which the controller 20 proceeds to operation 116. If the controller 20 determines in operation 114 that the further target value of the duration of the tooth brushing session at which the further sensory output is to be generated has not yet been reached, the controller 20 skips operation 115 and proceeds directly to operation 116.

In operation 116, the controller 20 checks if the user has terminated the tooth brushing session or carries on brushing. If the user carries on brushing, the controller 20 returns back to operation 113 in which the controller 20 keeps timing the duration of the tooth brushing session with the timer 22. If on the other hand the controller 20 determines in operation 116 that the user has terminated the tooth brushing session, the controller 20 may proceed to operation 117 in which data of the tooth brushing session, e.g. sensor data if present and the total duration of the tooth brushing session, optionally augmented by further information such as the time or day or the like, is stored in the data storage device (not shown). In addition, the controller 20 may send the collected data for evaluation to the evaluation module 60 in operation 117 over the data communication link 55 using the data communication interface 30, after which the first mode of operation terminates in operation 118.

At this point, it is noted that the further sensory output to encourage the user to continue brushing as generated in operation 115 preferably should be clearly distinguishable from other sensory outputs generated by the controller 20, e.g. sensory outputs signalling the completion of a time interval for brushing a particular section of the user's teeth or signalling the completion of the recommended duration of the tooth brushing session, such that the user does not confuse these different sensory outputs. For example, the further sensory output may be a particular vibration pattern generated with the motor 12 that is different to the vibration patterns used for the other sensory outputs, the further sensory output may be a different type of sensory output, e.g. an audible or visual output where the other sensory outputs are haptic outputs, a haptic output where the other sensory outputs are audible or visual outputs and so on. In a particular example, the further sensory output involves the controller 20 switching off the motor 12 at the further target value of the duration of the tooth brushing session, thereby forcing the user to switch the power toothbrush 10 back on in order to complete the tooth brushing session, which encourages the user to carry on brushing for longer.

Whilst the power toothbrush 10 is kept in its second mode of operation 120, the average total duration of a number of previous tooth brushing sessions is recalculated in operation 111 for each subsequent tooth brushing session. Therefore, if the user is responding to the further sensory output provided during the tooth brushing sessions in the second mode of operation 120 and consequently is extending the duration of the tooth brushing sessions, this average total duration will gradually increase. In other words, the point in time, i.e. the further target value, at which the further sensory output is to be generated is continually updated, and over time should move towards the recommended minimum duration of the tooth brushing session.

In an embodiment, the controller 20 in operation 112 further compares the calculated further target value with the recommended minimum duration of the tooth brushing session and if the difference between the calculated further target value and the recommended minimum duration falls below a defined threshold, e.g. a difference of less than 5 s or the two values are substantially identical, the controller 20 switches the mode of operation of the power toothbrush 10 back to the first mode of operation 110 as the user is now regularly or consistently complying with the recommended minimum duration of the tooth brushing sessions such that there no longer is a need to encourage the user to continue brushing beyond the point in time at which the user tends to terminate a tooth brushing session. Of course, the power toothbrush 10 may be switched from the second mode of operation 120 to the first mode of operation 110 in any suitable manner, e.g. through user intervention. For example, the user may be able to manually select the first mode of operation 110 or the second mode of operation 120, e.g. by holding the button 11 for set amount of time to toggle between the two modes of operation, or through any other suitable user interface, e.g. a user interface of the electronic device 50 acting as the evaluation module 60.

Figure 4:
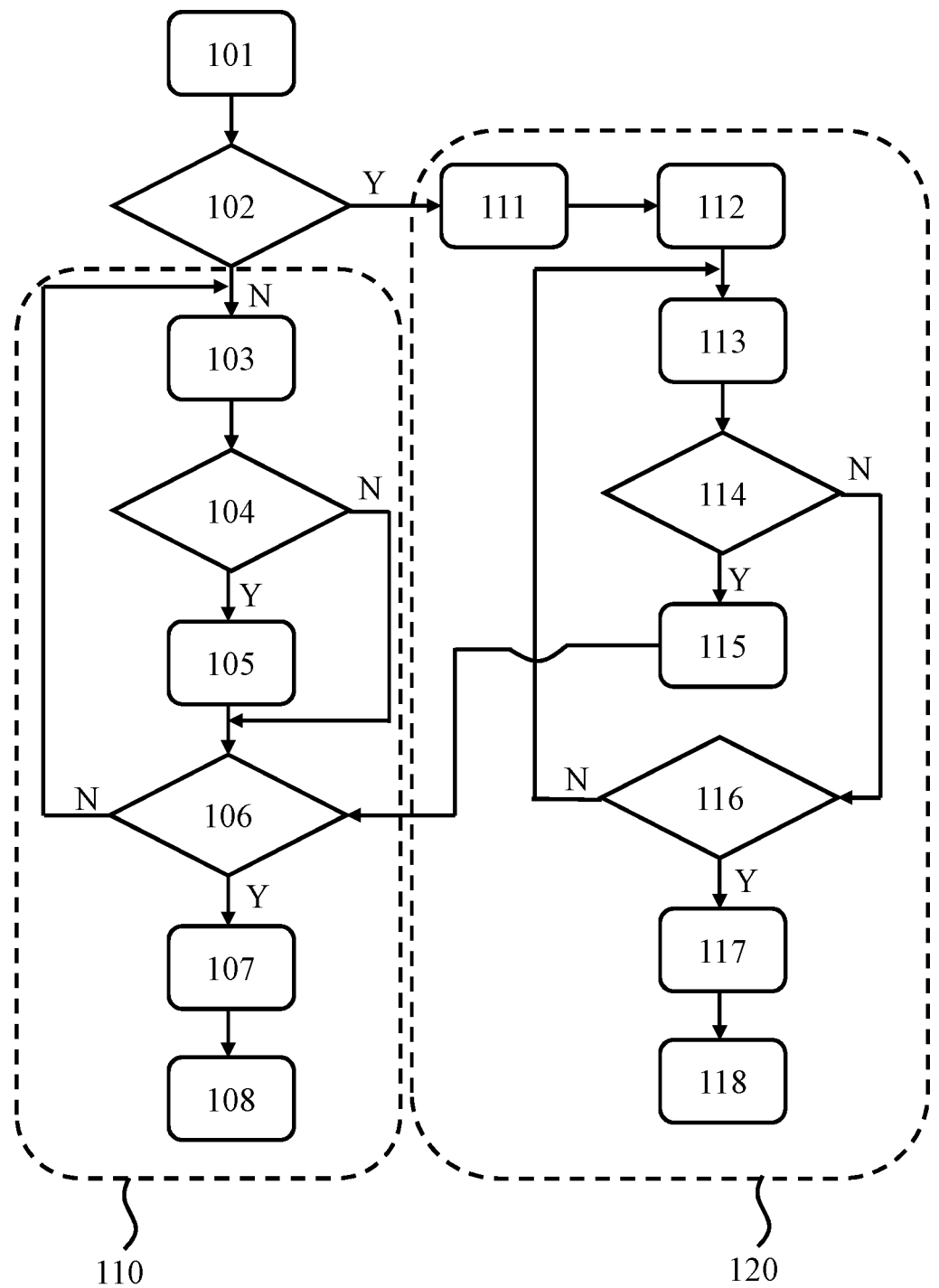
FIG. 4 schematically depicts a flowchart of a method of operating such a power toothbrush according to another embodiment.

In an alternative embodiment, which is schematically depicted in FIG. 4, the controller 20 is further adapted to generate the sensory output indicative of the tooth brushing session reaching the recommended minimum duration in the second mode of operation 120. In particular, once the controller 20 has caused the generation of the further sensory output in operation 115 to encourage the user to continue or extend the tooth brushing session, the user may then be incentivized to carry on brushing until the duration of the tooth brushing session has reached its recommended minimum duration. To this end, upon generation of the further sensory output in operation 115, the controller 20 may proceed to previously described operation 106 in which the controller 20 checks if the user has terminated the tooth brushing session such that where this is not yet the case, the controller 20 may cause the generation of the sensory output in operation 105 indicative of the duration of the tooth brushing session having reached its recommended minimum duration once the duration of the tooth brushing session reaches this point in time as checked in operation 104.

Figure 5:
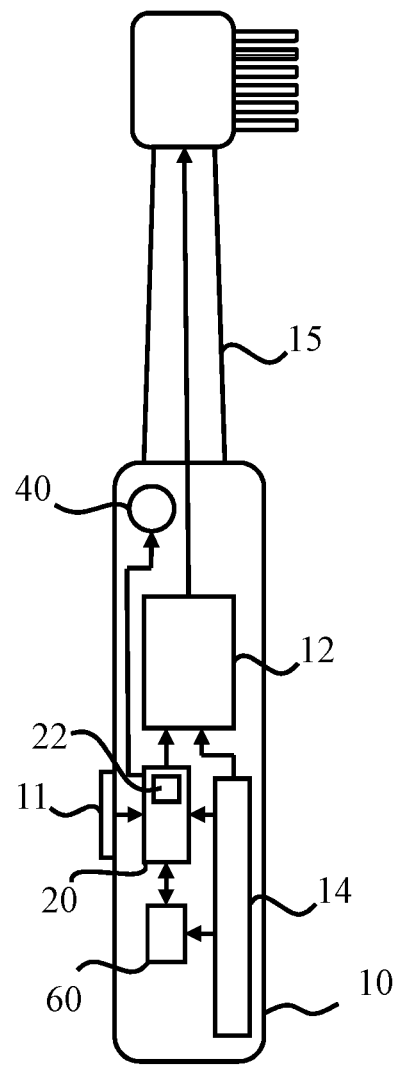
FIG. 5 schematically depicts a power toothbrush according to another embodiment.

FIG. 5 schematically depicts an alternative embodiment of the power toothbrush 10, in which the power toothbrush 10 includes the evaluation module 60, thus obviating the need for an external electronic device providing the functionality of the evaluation module 60. The evaluation module 60 may at least in part be implemented by the controller 20. To this end, the controller 20 may be implemented as a microprocessor or as a processor arrangement including one or more microprocessor or processor elements. Alternatively, the evaluation module 60 may be distinct from the controller 20, e.g. may be implemented as a processor arrangement in communication with the controller 20. It is noted for the avoidance of doubt that the communication interface 30 has been omitted from the power toothbrush 10 in FIG. 5 for the sake of clarity only and it should be understood that the communication interface 30 may still be present, e.g. to facilitate the transmission of tooth brushing session data to an external device, e.g. the electronic device 50, for evaluation.

Where reference is made to a computer-implemented method, it should be understood that this is intended to refer to a method that is performed on one or more data processing elements such as an electronic controller, processor or the like. The above described embodiments of the method 150 executed by the processor arrangement 52 may be realized by computer readable program instructions embodied on a computer readable storage medium having, when executed on a processor arrangement 52 of an electronic device 50, e.g. a smart phone, tablet computer or the like, or the power toothbrush 10, cause the processor arrangement 52 to implement any embodiment of the method 150. Any suitable computer readable storage medium may be used for this purpose, such as for example an optically readable medium such as a CD, DVD or Blu-Ray disc, a magnetically readable medium such as a hard disk, an electronic data storage device such as a memory stick or the like, and so on. The computer readable storage medium may be a medium that is accessible over a network such as the Internet, such that the computer readable program instructions may be accessed over the network. For example, the computer readable storage medium may be a network-attached storage device, a storage area network, cloud storage or the like. The computer readable storage medium may be an Internet-accessible service from which the computer readable program instructions may be obtained. In an embodiment, such a computer program product may be provided together with the power toothbrush 10 as an oral hygiene kit.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A power toothbrush comprising:
a handle onto which a brush head can be mounted;
a motor in the handle for driving a brush head mounted to the handle; and
a controller responsive to an operating mode selection signal and arranged to control said motor, said controller comprising a timer for timing a total duration of a tooth brushing session with said power toothbrush and being adapted to:
store the timed total duration of said tooth brushing session;
in a first mode of operation, cause the generation of a first sensory output during a tooth brushing session upon its duration reaching a first target value corresponding to a recommended duration of the tooth brushing session;
switch between the first mode of operation and a second mode of operation in response to said operating mode selection signal, and in said second mode of operation:
calculate an average total duration of a tooth brushing session based on at least some of the stored tooth brushing session times;
define a second target value based on the calculated average total duration of the stored tooth brushing total durations; and
cause the generation of a second sensory output during a tooth brushing session upon said duration reaching the second target value.

2. The power toothbrush of claim 1, wherein the controller is adapted to define the second target value as said calculated average total duration minus a defined amount of time.

3. The power toothbrush of claim 2, wherein the defined amount of time is in the range of 2 to 10 seconds.

4. The power toothbrush of claim 2, wherein the controller is further adapted to, in said second mode of operation:
calculate an updated average total duration of a tooth brushing session based on at least some of the stored tooth brushing session times including at least one tooth brushing session time stored after initiating said second mode of operation;
update the second target value based on the calculated updated average total duration of the stored tooth brushing total durations; and
cause the generation of the second sensory output during a tooth brushing session upon said duration reaching the updated second target value.

5. The power toothbrush of claim 2, wherein the first sensory output and the second sensory output are distinguishable sensory outputs.

6. The power toothbrush of claim 2, wherein the controller further comprises an evaluation module and is adapted to:
transmit tooth brushing session data including an indication of the total duration of a tooth brushing session to the evaluation module; and
receive the operation mode selection signal from the evaluation module.

7. The power toothbrush of claim 1, wherein the defined amount of time is in a range of 2 to 30 seconds.

8. The power toothbrush of claim 1, wherein the controller is further adapted to, in said second mode of operation:
calculate an updated average total duration of a tooth brushing session based on at least some of the stored tooth brushing session times including at least one tooth brushing session time stored after initiating said second mode of operation;
update the second target value based on the calculated updated average total duration of the stored tooth brushing total durations; and
cause the generation of the second sensory output during a tooth brushing session upon said duration reaching the updated second target value.

9. The electronic toothbrush of claim 8, wherein the controller is further adapted to, in said second mode of operation:
compare the updated second target value with the first target value; and
switch from the second mode of operation to the first mode of operation upon a difference between said updated second target value and the first target value falling below a defined threshold.

10. The power toothbrush of claim 1, wherein the controller is adapted to cause the generation of at least one of the first sensory output and the second sensory output with the motor.

11. The power toothbrush of claim 10, wherein the controller is adapted to switch off said motor at the second target value or the updated second target value.

12. The power toothbrush of claim 1, further comprising a sensory output device, wherein the controller is adapted to cause the generation of at least one of the first sensory output and the second sensory output with the sensory output device.

13. The power toothbrush of claim 1, wherein the first sensory output and the second sensory output are distinguishable sensory outputs.

14. The power toothbrush of claim 1, wherein the controller further comprises an evaluation module and is adapted to:
   transmit tooth brushing session data including an indication of the total duration of a tooth brushing session to the evaluation module; and
   receive the operation mode selection signal from the evaluation module.

15. A computer-implemented method of controlling an operating mode of a power toothbrush, wherein the power toothbrush provides tooth brushing session data including an indication of the total duration of a tooth brushing session, the method comprising:
   receiving tooth brushing session data from a controller of the power toothbrush while it is operating in a first mode during which the total duration of a tooth brushing session is compared with a recommended target value for the total duration of the tooth brushing session;
   evaluating, after receiving tooth brushing session data from the power toothbrush for a plurality of tooth brushing sessions, compliance of the total duration of each tooth brushing session with the recommended target value for said total duration; and
   if said evaluation shows that for at least some of the tooth brushing sessions in said plurality of tooth brushing sessions the total duration of said tooth brushing sessions is shorter than the recommended target value for said total duration, transmitting an operation mode selection signal to said controller to switch to a second mode during which an average total duration of a tooth brushing session is calculated based on at least some of the stored tooth brushing session times and a second target value is based on the calculated average total duration of the stored tooth brushing total durations.

16. A non-transitory computer readable storage medium comprising instructions stored thereon, that, when executed on a processor arrangement of an evaluation module, cause the processor arrangement to perform the steps of
   receiving tooth brushing session data from a controller of a power toothbrush while it is operating in a fist mode during which the total duration of a tooth brushing session is compared with a recommended target value for the total duration of the tooth brushing session;
   evaluating, after receiving tooth brushing session data from the power toothbrush for a plurality of tooth brushing sessions, compliance of the total duration of each tooth brushing session with the recommended target value for said total duration; and
   if said evaluation shows that for at least some of the tooth brushing sessions in said plurality of tooth brushing sessions the total duration of said tooth brushing sessions is shorter than the recommended target value for said total duration, transmitting an operation mode selection signal to said controller to switch to a second mode during which an average total duration of the tooth brushing session is calculated based on at least some of the stored tooth brushing session times and a second target value is based on the calculated average total duration of the stored tooth brushing durations.

* * * * *